US010892647B2

(12) United States Patent
Kim et al.

(10) Patent No.: US 10,892,647 B2
(45) Date of Patent: Jan. 12, 2021

(54) WIRELESS POWER TRANSMITTER WITH DATA COMMUNICATION PROVISION

(71) Applicant: WITS Co., Ltd., Yongin-si (KR)

(72) Inventors: Se Joo Kim, Suwon-si (KR); Jung Woo Choi, Suwon-si (KR); Tae Seok Ko, Suwon-si (KR); Byoung Woo Ryu, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 182 days.

(21) Appl. No.: 16/136,648

(22) Filed: Sep. 20, 2018

(65) Prior Publication Data

US 2019/0148980 A1     May 16, 2019

(30) Foreign Application Priority Data

Nov. 14, 2017  (KR) .......................... 10-2017-0151762
Feb. 2, 2018    (KR) .......................... 10-2018-0013289

(51) Int. Cl.
*H02J 50/12*     (2016.01)
*H02J 50/80*     (2016.01)
*H02J 50/05*     (2016.01)

(52) U.S. Cl.
CPC .............. *H02J 50/12* (2016.02); *H02J 50/05* (2016.02); *H02J 50/80* (2016.02)

(58) Field of Classification Search
CPC ............. H02J 50/12; H02J 50/05; H02J 50/80
See application file for complete search history.

(56) References Cited

U.S. PATENT DOCUMENTS

| 2014/0062395 A1* | 3/2014 | Kwon | H02J 5/005 320/108 |
| 2015/0115727 A1* | 4/2015 | Carobolante | H02J 50/40 307/104 |
| 2015/0341087 A1* | 11/2015 | Moore | H02J 50/50 455/77 |
| 2019/0229771 A1* | 7/2019 | Lee | H02J 50/90 |
| 2019/0319674 A1* | 10/2019 | Du | H02J 3/385 |

FOREIGN PATENT DOCUMENTS

| JP | 2013-90514 A | 5/2013 |
| KR | 10-2015-0051923 A | 5/2015 |
| KR | 10-2017-0057095 A | 5/2017 |

* cited by examiner

*Primary Examiner* — Jared Fureman
*Assistant Examiner* — Duc M Pham
(74) *Attorney, Agent, or Firm* — Harness, Dickey & Pierce, P.L.C.

(57) ABSTRACT

A wireless power transmitter having a data transmission and reception capability is disclosed. The wireless power transmitter includes a main coil to transmit power, an inverter to apply an alternating current (AC) signal to the main coil, a communication module to output a transmission signal including transmission data to be wirelessly transmitted the wireless power transmitter, and/or receive a reception signal including received data wirelessly received by the wireless power transmitter, a first connecting circuitry to prevent a power signal of the main coil from being input to the communication module, and the auxiliary coil to connect to the main coil and connected to the first connecting circuitry. The main coil or the auxiliary coil may be configured to transmit the transmission data and receive the reception signal, and the auxiliary coil may be wiredly connected to the main coil or not wiredly connected to the main coil.

29 Claims, 7 Drawing Sheets

WIRELESS POWER TRANSMITTER WITH DATA COMMUNICATION PROVISION

CROSS-REFERENCE TO RELATED APPLICATION(S)

This application claims benefit under 35 USC 119(a) of Korean Patent Application Nos. 10-2017-0151762, filed on Nov. 14, 2017, and 10-2018-0013289, filed on Feb. 2, 2018, in the Korean Intellectual Property Office, the respective entire disclosures of which are incorporated herein by reference in their entirety for all purposes.

BACKGROUND

1. Field

The present disclosure relates to a wireless power transmitter having a wireless power transmission/receipt capability and a data communications capability for transmitting and/or receiving data.

2. Description of Related Art

Wireless power transmission technology is increasingly being utilized in various fields. For example, wireless charging is widely provided in mobile devices such as smartphones which have recently been released. In addition, apparatuses for wirelessly transmitting power to such mobile devices are being implemented in various apparatuses, such as vehicles and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes a main coil configured to transmit power, an inverter configured to apply an alternating current (AC) signal to the main coil, a communication module configured to output a transmission signal including transmission data to be wirelessly transmitted the wireless power transmitter, and/or receive a reception signal including received data wirelessly received by the wireless power transmitter, a first connecting circuitry configured to prevent a power signal of the main coil from being input to the communication module, and the auxiliary coil configured to connect to the main coil and connected to the first connecting circuitry.

The first connecting circuitry may be disposed between the main coil and the communication module and configured to prevent the power signal of the main coil from affecting the communication module, and the auxiliary coil may be connected with the main coil in parallel through selective connection of the first connecting circuitry to the main coil for transmission of the transmission data by the main coil or for reception of the reception signal received by the main coil.

The auxiliary coil may not be wiredly connected to the main coil, and the transmission data may be transmitted by the auxiliary coil or the reception signal is received by the auxiliary coil.

A first input terminal of the communication module may be connected to one end of the main coil through the first connecting circuitry, a second input terminal of the communication module may be connected to another end of the main coil through the first connecting circuitry, and the auxiliary coil may be connected between the first input terminal of the communication module and the second input terminal of the communication module.

The main coil may have an inductance, which in combination with a connected capacitance, and may be configured to generate a resonance tank for wirelessly transmitting power, and the auxiliary coil may have an inductance that when selectively connected in parallel with the main coil results in a lower combined inductance for wireless transmitting the transmission data at a frequency of 13.56 MHz or wirelessly receiving the received data at the frequency of 13.56 MHz.

The auxiliary coil may be a chip inductor.

The first connecting circuitry may include a first switching element connected between one end of the main coil and a first input terminal of the communication module, and a second switching element connected between another end of the main coil and a second input terminal of the communication module.

The wireless power transmitter may further include a controller configured to control the first switching element and the second switching element to be turned-off when the inverter outputs the AC signal, and to be turned-on when the communication module outputs the transmission signal or the reception signal is received by the main coil.

The first connecting circuitry may include a first filter connected between one end of the main coil and a first input terminal of the communication module and having a pass frequency band, a frequency band used for data communications, and may include a second filter connected between another end of the main coil and a second input terminal of the communication module and having the pass frequency band. The pass frequency band may include a frequency of 13.56 MHz and does not include power transmission frequencies.

Each of the first filter and the second filter may include an inductance and a capacitance connected to the inductance in series.

The wireless power transmitter may further include a second connecting circuitry disposed between the main coil and the inverter and configured to prevent the transmission signal or the reception signal from being introduced to the inverter.

The second connecting circuitry may include a first switching element connected between one end of the main coil and a first input terminal of the inverter, and a second switching element connected between another other end of the main coil and a second input terminal of the inverter.

The second connecting circuitry may include a first filter connected between one end of the main coil and a first input terminal of the inverter and having a cutoff frequency band, a frequency band used for data communications, and may include a second filter connected between another end of the main coil and a second input terminal of the inverter and having the cutoff frequency band. The cut off frequency band may include 13.56 MHz.

The wireless power transmitter may further include a controller configured to determine whether a data communications card is in proximity of the wireless power transmitter using a received signal received by the main coil, and may control power to not be transmitted when the data communications card is determined to be in proximity of the wireless power transmitter.

When the controller determines that the received signal received by the main coil is not a signal modulated by an active load modulation, the controller may determine that the data communications card is in proximity of the wireless power transmitter.

The wireless power transmitter may further include a display configured to display, when the data communications card is detected in proximity of the wireless power transmitter, an indication that the data communications card is in proximity of the wireless power transmitter.

In one general aspect, a wireless power transmitter includes a power transmitting coil configured to transmit power, a communications coil configured to transmit and receive data and disposed separate from and adjacent to the power transmitting coil, an inverter configured to apply an alternating current (AC) signal to the power transmitting coil, a communication module configured to output a transmission signal including transmission data to be transmitted by the communications coil and/or receive a reception signal including received data received through the communications coil, and a connecting circuitry disposed between the communications coil and the communication module and configured to prevent power induced, by another coil outside of the communications coil, in the communications coil from being introduced to the communication module.

The connecting circuitry may include a first filter connected between one end of the communications coil and a first input terminal of the communication module and having a pass frequency band, a frequency band used for data communications, and may include a second filter connected between another end of the communications coil and a second input terminal of the communication module and having the pass frequency band. The pass frequency band may include a frequency of 13.56 MHz and not include power transmission frequencies.

The wireless power transmitter may further include a controller configured to determine whether a data communications card is in proximity of the wireless power transmitter using a received signal received by the power transmitting coil, and control power to not be transmitted when the controller determines that the data communications card is in proximity of the wireless power transmitter.

In one general aspect, a wireless power transmission method for a wireless power transmitter having a resonance tank configured for wireless power transfer using an alternating current (AC) signal from an AC source, a first connecting circuitry configured to prevent a power signal of the resonance tank from being input to a near field communication module configured to output a transmission signal including transmission data to be transmitted by the wireless power transmitter and/or receive a reception signal including received data by the wireless power transmitter, and an auxiliary coil configured to connect to the main coil and connected to the first connecting circuitry, includes transmitting a signal using the main coil, determining whether a signal received by the main coil in response to the transmitted signal is signal modulated by an active load modulation, when the determining of whether the received signal is signal modulated by the active load modulation indicates that the received signal is signal modulated by the active load modulation, determining that a data communications card is not in proximity of the wireless power transmitter, controlling the wireless power transmitter to transmit power to a detected wireless power receiver, and when the determining of whether the received signal is signal modulated by the active load modulation indicates that the received signal is not signal modulated by the active load modulation, determining that the data communications card is in proximity of the wireless power transmitter and controlling the wireless power transmitter to not transmit power to the detected wireless power receiver.

In one general aspect, a wireless power transmitter includes a resonance tank configured for wireless power transfer using an alternating current (AC) signal from an AC source, a first connecting circuitry configured to prevent a power signal of the resonance tank from being input to a near field communication module configured to output a transmission signal including transmission data to be transmitted by the wireless power transmitter and/or receive a reception signal including received data by the wireless power transmitter, and an auxiliary coil configured to connect to the main coil and connected to the first connecting circuitry.

The wireless power transmitter may further include the AC source configured for selective non-provision of the AC signal to the resonance tank when a near field communication element is determined within a proximity of the wireless power transmitter.

The wireless power transmitter may further include the near field communication module configured for selective output of the transmission signal or reception of the reception signal when a near field communication element is determined within a proximity of the wireless power transmitter.

The wireless power transmitter may further include a second connecting circuitry configured to prevent near field communication data from affecting the AC source.

The first connecting circuitry may prevent the power signal of the resonance tank, provided through wireless coupling from the resonance tank, from being input to the near field communication module, and the first connecting circuitry may band pass or selectively connect the transmission signal or the reception signal between the auxiliary coil and the near field communication module.

The first connecting circuitry may prevent the power signal of the resonance tank, provided through wired connection with the resonance tank, from being input to the near field communication module, and the first connecting circuitry may band pass or selectively connect the transmission signal or the reception signal between the near field communication module and the resonance tank.

The first connecting circuitry may selectively connect the auxiliary coil to the resonance tank, with resonance tank having a first inductance when the auxiliary coil is selectively not connected to the resonance tank by the first connecting circuitry, and having a lower second inductance when the auxiliary coil is selectively connected to the resonance tank by the first connecting circuitry with a higher self-resonance frequency.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
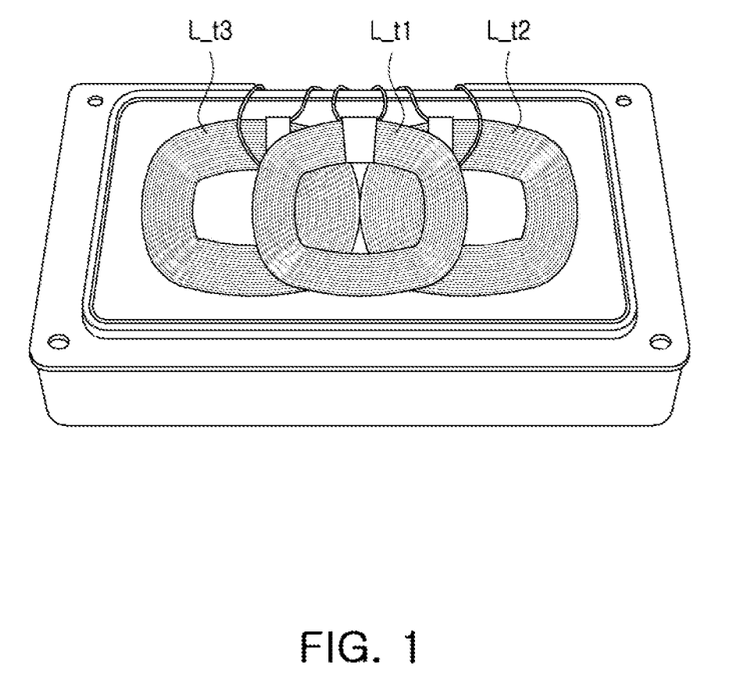
FIG. 1 is a view illustrating a wireless power transmitter, according to one or more embodiments.

FIG. 1 is a view illustrating a wireless power transmitter, according to one or more embodiments.

As illustrated in FIG. 1, the wireless power transmitter may include a plurality of coils $L\_t1$, $L\_t2$, and $L\_t3$, for example. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

For example, the wireless power transmitter is capable of wirelessly transmitting power through any one of the plurality of coils $L\_t1$, $L\_t2$, and $L\_t3$, e.g., according to a position of receiving coils of a wireless power receiver, and the like. The wireless power receiver may also have such plural coils, or may include only a single coil, configured for reception of wireless power. While discussions are made of the wireless power transmitter wireless transmitting power, or the wireless power receiver wireless receiving such transmitted power, examples also exist where the wireless power transmitter is configured to accept received wireless power transmission transmitted by such a wireless power receiver, or another power transmitting device.

In addition, the wireless power transmitter is capable of using any one of the plurality of coils $L\_t1$, $L\_t2$, and $L\_t3$ as a coil for data transmission and reception. For example, the wireless power transmitter may use the coil $L\_t1$ of the plurality of coils $L\_t1$, $L\_t2$, and $L\_t3$ as a coil for near field communications (NFC) using an NFC protocol with such another data reception or data transmission and reception device. For example, the above example wireless power receiver may also be configured capable of reception and/or transmission of data with the wireless power transmitter using the example coil L_t1, or any other of the coils L_t2 and L_t3. Also, while an example of three coils is demonstrated, examples are not limited thereto.

Accordingly, at least one (e.g., the coil L_t1) of the plurality of coils L_t1, L_t2, and L_t3 of the wireless power transmitter according to one or more embodiments may be used to transmit power and may be used to transmit and receive data.

Figure 2:
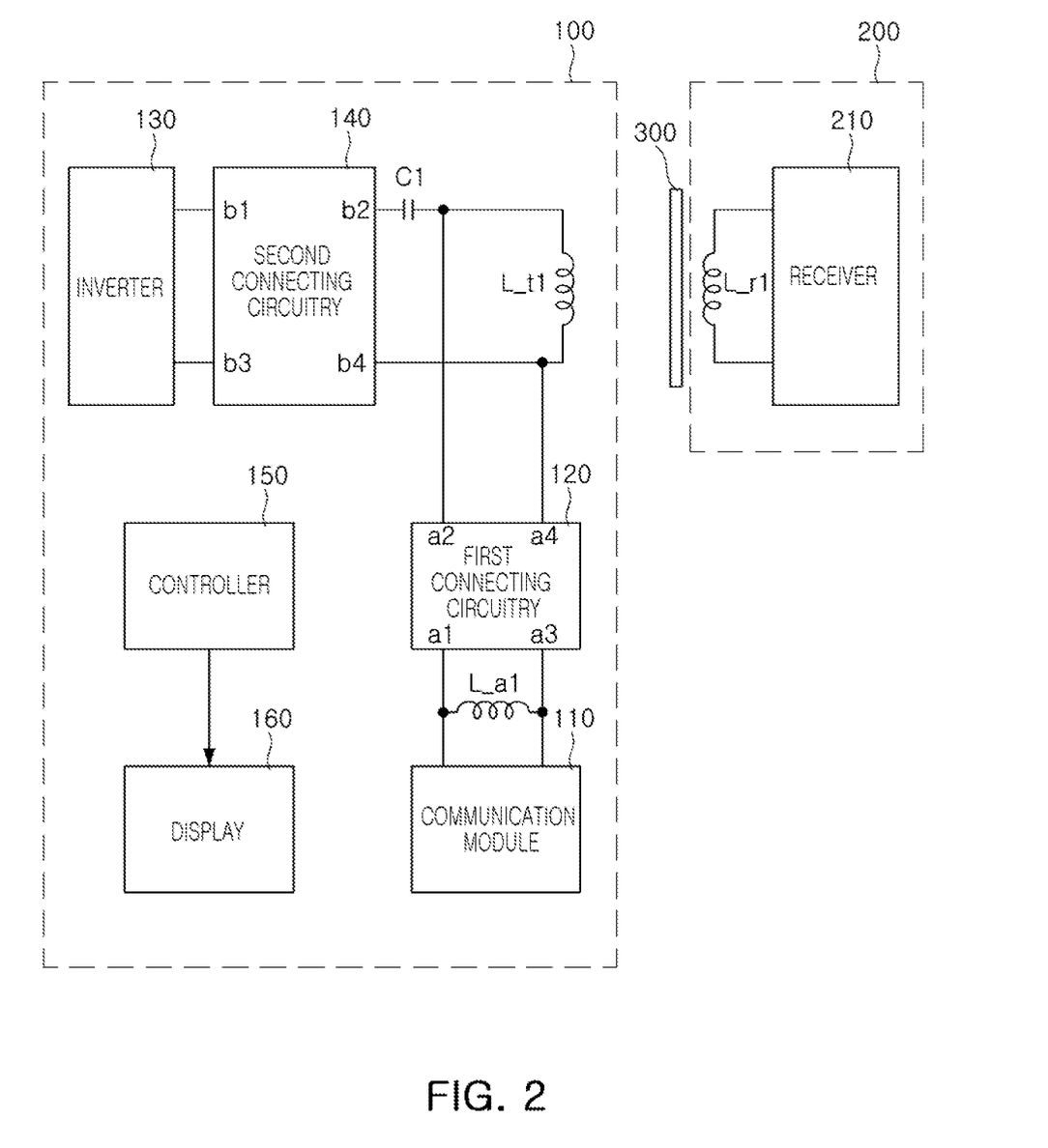
FIG. 2 is a schematic block diagram of a configuration of a wireless power transmitter, according to one or more embodiments

FIG. 2 is a schematic block diagram of a configuration of a wireless power transmitter, according to one or more embodiments. As a non-limiting example, the wireless power transmitter 100 may include a communication module 110, a first connecting circuitry 120, an inverter 130, a second connecting circuitry 140, a controller 150, a display 160, a capacitance or capacitor C1, a coil L_t1, and an auxiliary coil L_a1. In addition, reference numeral 200 denotes a device including a wireless power receiver 210 and reference numeral 300 denotes a card having an NFC capability. In an example, the wireless power transmitter 100 may correspond to the wireless power transmitter of FIG. 1. The coil L_r1 may be representative of a single coil, a combination of coils, have the configuration of the coils of FIG. 1, or have the configuration of coils of FIG. 7, through examples are not limited thereto.

The wireless power transmitter 100 may wirelessly transmit the power to the device 200 through the coil L_t1. In addition, the wireless power transmitter 100 may transmit and receive data to and from the card 300 and/or the device 200 through the coil L_t1. Briefly, as noted above, though the coil L_t1 is referenced and that such a coil may correspond to the coil L_t1 of FIG. 1, examples are not limited thereto as other coils of FIG. 1 may be alternatively or additionally used for coil L_t1 of FIG. 2 or still another coil configuration may be used. The wireless power transmitter 100 may be installed at various positions or devices. For example, in an example the wireless power transmitter 100 is installed in a vehicle. In an alternative example, the wireless power transmitter 100 may be implemented as a separate apparatus, e.g., as a device primarily directed to providing wireless power to other devices, and which may be supplied the power for transmission from a hardwire and/or battery source of the wireless power transmitter or through another source, as a non-limiting example.

The communication module 110 may output a transmission signal, a signal including data, to the coil L_t1, or may be provided a reception signal, as a signal including the data received through the coil L_t1.

The first connecting circuitry 120 may be disposed between the communication module 110 and the coil L_t1 and may block power, which may be transmitted through the coil L_t1, from being introduced into the communication module 110. For example, the first connecting circuitry 120 may block the power from the coil L_t1 from being introduced into the communication module 110 by passing or transmitting only a signal within a specific frequency band, e.g., within a select frequency band used for data communications through the coil L_t1. Specifically, in a case in which the communication module 110 transmits and receives data with the wireless power receiver 210 through an implemented NFC scheme, the first connecting circuitry 120 may only pass or transmit a signal of 13.56 MHz, or within a set frequency band surrounding 13.56 MHz, and block other signals outside of the set frequency band. Therefore, by preventing the provision of signals other than the desired 13.56 MHz signal to the communication module 110, data communications may be more efficiently performed without errors and without damage on the communication module 110 due to the prevention of provision of signals, such as high power signals, of other frequencies, outside of the set frequency band, to the communication module 110. For example, a high power transmission signal may be generated within the interaction of the capacitance C1 and the coil L_t1 of a frequency that is blocked by the first connecting circuitry 120, and thereby prevented from damaging the communication module 110.

The inverter 130 may output an alternating current (AC) signal for wireless power transmission to the coil L_t1. For example, the inverter 130 may output the AC signal of several hundreds of kHz or less to the coil L_t1.

Similar to the first connecting circuit 120, the second connecting circuitry 140 may be disposed between the inverter 130 and the coil L_t1 and may block a data transmission signal output by the communication module 110 or a data reception signal received by the coil L_t1, e.g., provided to the communication module 110, thereby blocking the data transmission or reception signals within an example preset frequency band of the data transmission/reception signal from being provided to or received by the inverter 130. For example, the second connecting circuitry 140 may block only a signal within the example preset or specific frequency band, e.g., blocking signal(s) within one or more specific frequency bands respectively used for data communications. In an example, the communication module 110 transmits and receives data in accordance with one or more NFC schemes, the second connecting circuitry 140 may block a signal of 13.56 MHz used for an example NFC scheme while permitting other signals to pass. Therefore, since signals used for data communications by the communication module 110, or otherwise received by the coil L_t1, are prevented from being passed or otherwise further transmitted to the inverter 130, data communications can be more efficiently performed without errors.

The capacitance C1, which will hereinafter be referred to capacitor C1, may be implemented by one capacitor, plural capacitors, or a capacitance system including one or more capacitances. Thus, the capacitor C1 and the coil L_t1 may serve as a resonance tank for wirelessly transmitting power. In addition, the coil L_t1 may be used to transmit data to the outside or receive data from the outside as transmitted through the coil L_t1.

The example auxiliary coil L_a1 may be selectively connected to the coil L_t1 in parallel through the first connecting circuitry 120 and may be a chip inductor. Briefly, though the example auxiliary coil L_a1 is illustrated a single coil or a chip inductor, examples are not limited thereto and alternative examples include plural auxiliary coils or coil system.

The coil L_t1 may have a large inductance to wirelessly transmit power. For example, the inductance of the coil L_t1 may be 6.4 µH or more. In addition, the coil L_t1 may have a large number of turns and may have a Litz wire form, e.g., with multiple strands that may be configured in parallel, to reduce a skin effect of the wire. Due to these multiple turns and Litz wire configuration, a self-resonance frequency may be lower than in an example where the coil L_t1 has a single strand or one or more strands in non-Litz wire form. For this reason, the coil L_t1 is more influenced by a capacitance component than an inductance component in the example frequency band used for data communications, e.g. such as at or around the non-limiting 13.56 MHz data communication frequency, resulting in it being difficult to perform smooth data communications using only the coil L_t1.

Rather, the auxiliary coil L_a1 may have a sufficiently small inductance. That is, the inductance of the auxiliary coil L_a1 may be appropriately selected in an example so that a composite inductance of the auxiliary coil L_a1 and the coil L_t1 is 1 µH or less. Therefore, a resulting effective coil in which the auxiliary coil L_a1 and the coil L_t1 are coupled to each other may have a high self-resonance frequency with respect to the data communications frequency, and as a result, data may be smoothly transmitted and received through the coil L_t1 when coupled to the auxiliary coil L_a1. In addition, by using the auxiliary coil L_a1 in a form of a chip inductor in an example, data communications are possible without increasing an area of a coil portion of the wireless power transmitter 100, e.g., the coil portion(s) of the example coils L_t1, L_t2, and L_t3 of FIG. 1, and since respective separate lead wires and the like are used for the coil L_t1 and the auxiliary coil L_a1, a process of manufacturing the wireless power transmitter may also be simplified and material costs may be reduced.

The controller 150 may control operations of the communication module 110, selectively implementing data communication encodings and transmissions and/or receptions and decodings, as well as selective operations of the inverter 130 to control the production of power and provision of the same to the coil L_t1 for power transmission, for example. In addition, the controller 150 may also receive the data received and decoded by the communication module 110 and perform further operations based on the decoded results thereof, or alternatively the controller 150 may perform the decodings of the received data communication signals by the communication module 110. In a non-limiting example, the controller 150 may also control an operation of the first connecting circuitry 120 and/or the second connecting circuitry 140. In addition, in one or more examples, the controller 150 may detect whether an NFC element 300, hereinafter referred to as an NFC card 300, is present, and may control the operation of the communication module 110 and/or the inverter 130 depending on the detection result. In addition, the controller 150 may also provide information on whether the NFC card 300 is detected present to a user through the display 160. In an example, the controller 150 is representative of one or more processors and one or more memories, e.g., storing instructions which when executed by the one or more processors configure the one or more processors to implement one or more or all controller operations described herein. In another example, the controller 150 is representative of hardware only, e.g., circuitry, configured to implement one or more or all controller operations described herein.

The display 160 may be implemented as a light emitting diode (LED) or the like, and may be controlled by the controller 150 to inform or warn the user that the NFC card 300 is detected, inform the user of the information on whether the NFC card 300 is present, and/or inform the user of an operation state of the wireless power transmitter, e.g., whether the wireless power transmitter is inactive or transmitting power, transmitting communications data, and/or receiving communications data, or performing another operation of the wireless power transmitter.

The device 200 may include the coil L_r1 and the wireless power receiver 210. In an example, the coil L_r1 may be included in the wireless power receiver 210. The device 200 may receive power through the coil L_r1. In addition, the device 200 may also transmit and receive data through the coil L_r1. For example, the device 200 may also transmit and receive the data in an NFC scheme through the coil L_r1. In the respective cases, the wireless power receiver 210 may perform an appropriate operation, such as display the received data or store the received data. Although FIG. 2 illustrates a case in which the reception of power and the transmission and reception of data are performed through one coil L_r1, the device 200 may also include a coil for receiving power and a separate coil for transmitting and receiving data. The coil L_r1 may also be representative of plural such coils, and correspond to the multiple coil structure of FIG. 1 of FIG. 7, or another coil structure, as non-limiting examples. In an example, the device 200 may also have a same or similar structure as the wireless power transmitter 100 or the wireless power transmitter 103 of FIG. 8, or another configuration.

As non-limiting example, the card 300 may be a government, public, or private transit card, security card, and/or a credit or debit card, or other hardware local wireless or NFC element or device, having local communication capabilities, for example, an NFC capability by being configured to transmit and/or receive data through any example NFC scheme. For example, as illustrated in FIG. 2, the card 300 may be positioned adjacent to the wireless power transmitter 100 together with the device 200. For example, the card 300 may approach the wireless power transmitter 100 by being inserted into a case of or attached to the device 200 or the like. For example, the card 300 may be placed in a mobile phone wallet that supports both the card 300 and the mobile phone, so the card 300 is within proximity or range, e.g., coupling range, of the coil L_t1 and/or the coil L_r1. In such an example, the user may be notified by the controller 150, e.g., through the display 160, of the presence of the card 300 prior to the controller 150 permitting the coil L_t1 to provide power for the wireless power transmission, or upon the detection of the card 300 and resulting suspension of the wireless transmission, thereby enabling the user an opportunity to remove the card 300 from the mobile phone wallet before the wireless power transmission occurs or renews transmission. If the wireless power transmission occurs while the card 300 is within such proximity to the provided wireless power transmission, the card 300 could be damaged or burnt because the data communication circuitry of the card 300 may not be able to handle the transmitted high power and may fail.

Figure 3:
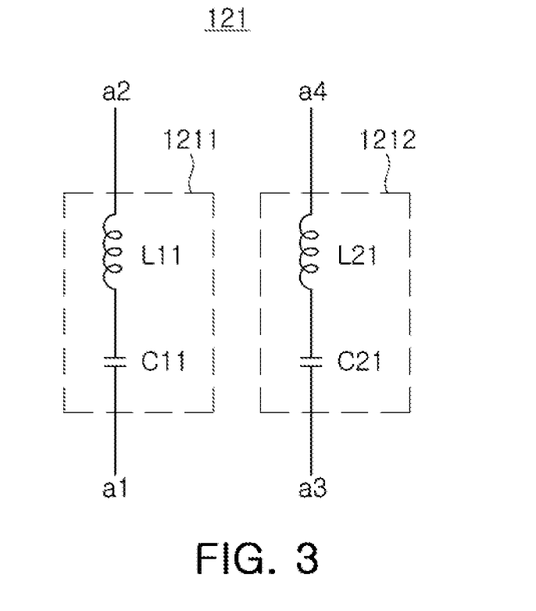
FIGS. 3 and 4 are schematic views illustrating examples of a first connecting circuitry of a wireless power transmitter, according to one or more embodiments.

FIG. 3 is a schematic view illustrating an example of a first connecting circuitry of a wireless power transmitter according to one or more embodiments. In an example, the first connecting circuitry 121 of FIG. 3 may correspond to the first connecting circuitry 120 of FIG. 2, though examples are not limited thereto. The first connecting circuitry 121 may include a first filter 1211 and a second filter 1212. For explanation purposes, each of the terminals a1, a2, a3, and a4 in FIG. 3 will be referred to the same as each of the terminals a1, a2, a3, and a4 illustrated in FIG. 2, again noting that examples are not limited thereto. In such examples, a1 may be a first input terminal of a communication module, e.g., the communication module 110, a3 may be a second input terminal of the communication module, a2 may be one end of a wireless power transmitter coil, e.g., the coil L_t1, and a4 may be the other end of the coil. For non-limiting explanation purposes, the communication module will be referred to as the communication module 110 of FIG. 2 and the coil will be referred to as the coil L_t1 of FIG. 2.

Each of the first filter 1211 and the second filter 1212 may be a band-pass filter of which a pass frequency is a frequency used for data communications, such as at or around the above non-limiting example 13.56 MHz data communication frequency. The first filter 1211 may be connected between the first input terminal a1 of the communication module 110 and one end a2 of the coil L_t1, and the second filter 1212 may be connected between the second input terminal a3 of the communication module 110 and the other end a4 of the coil L_t1. As illustrated in FIG. 3, the first filter 1211 may include an inductance or inductor L11 and a capacitance or capacitor C11 which are connected in series with each other, and the second filter 1212 may include an inductance or inductor L21 and a capacitance or capacitor C21 which are connected in series with each other.

Although FIG. 3 illustrates a case in which the first connecting circuitry 121 includes two filters, the first connecting circuitry 121 may also include one filter or more than two filters, in some examples. That is, the first connecting circuitry 121 may include one or more band-pass filters.

Figure 4:
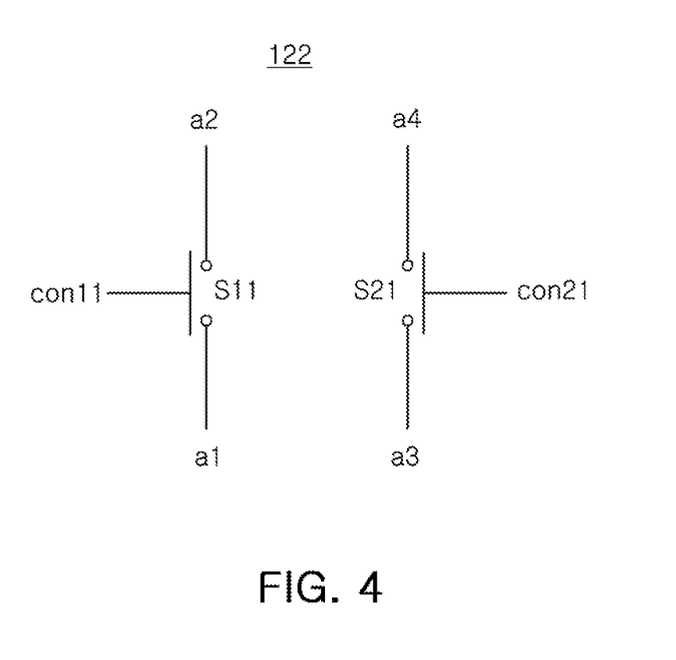

FIG. 4 is a schematic view illustrating an example of a first connecting circuitry of a wireless power transmitter according to one or more embodiments. In an example, the first connecting circuitry 122 of FIG. 4 may correspond to the first connecting circuitry 120 of FIG. 2, though examples are not limited thereto. The first connecting circuitry 122 may include a first switch S11 and a second switch S21. For explanation purposes, each of the terminals a1, a2, a3, and a4 in FIG. 4 will be referred to the same as each of the terminals a1, a2, a3, and a4 illustrated in FIG. 2, again noting that examples are not limited thereto.

The first switch S11 and the second switch S21 may be controlled to only turn-on when a wireless power transmission coil, e.g. the coil L_t1 of FIG. 2, is used for data communications and may be controlled to switch to or maintain a turned-off status otherwise. For non-limiting explanation purposes, the coil will be referred to as the coil L_t1 of FIG. 2. In an example, the first switch S11 and the second switch S21 may be turned-on only when the controller, e.g., controller 150 of FIG. 2, determines or controls a signal within a frequency band used for data communications be applied to the coil L_t1 or determines or controls the signal of the frequency band used for data communications to be received through the coil L_t1. In another example, the operating of the first switch S11 and the second switch S21 in the turned on or turned off modes may be controlled by a data communication module, e.g., the data communication module 110 of FIG. 2. For non-limiting explanation purposes, the controller will be referred to as the controller 150 of FIG. 2, and the data communication module will be referred to as the data communication module 110 of FIG. 2.

Thus, in an example where the first switch S11 and the second switch S21 are controlled by the controller 150. To this end, the controller 150 may include, or be connected to, circuitry of the wireless power transmitter configured to monitor a frequency or magnitude of signals of the coil L_t1, such as signals received through the coil L_t1. Alternatively or additionally, the controller 150 may also control the first switch S11 and the second switch S21 depending on operation modes of the wireless power transmitter set by the controller 150.

The first switch S11 may be connected between the first input terminal a1 of the communication module 110 and one end a2 of the coil L_t1, and the second switch S21 may be connected between the second input terminal a3 of the communication module 110 and the other end a4 of the coil L_t1. In addition, each of the first switch S11 and the second switch S21 may be a relay switch and may also be a semiconductor switch. In the example where each of the first switch S11 and the second switch S21 is the relay switch, the first switch S11 and the second switch S21 may more reliably prevent the power from being wirelessly transmitted to the communication module 110, e.g., compared to the example semiconductor switch.

Although FIG. 4 illustrates a case in which the first connecting circuitry 122 includes two switches, the first connecting circuitry 122 may also include one switch or more than two switches, in some examples. That is, the first connecting circuitry 122 may include one or more switches.

Figure 5:
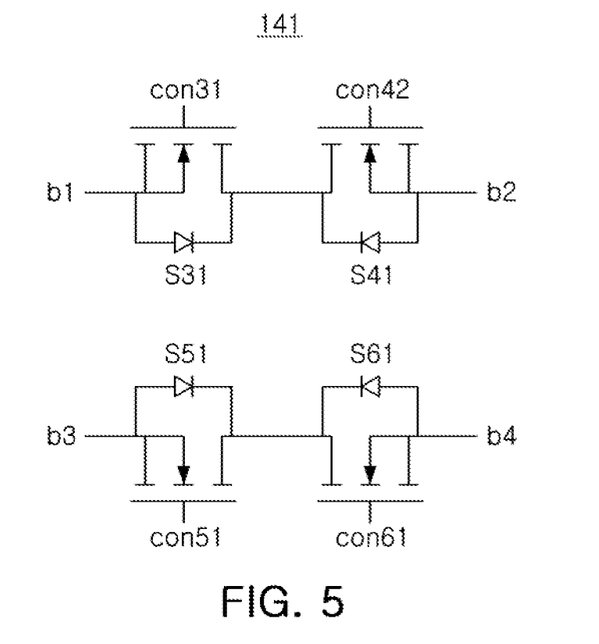
FIGS. 5 and 6 are schematic views illustrating examples of a second connecting circuitry of a wireless power transmitter, according to one or more embodiments.

FIG. 5 is a schematic view illustrating an example of a second connecting circuitry of a wireless power transmitter according to one or more embodiments. In an example, the second connecting circuitry 141 of FIG. 5 may correspond to the second connecting circuitry 140 of FIG. 2. The second connecting circuitry 141 may include a plurality of switches S31, S41, S51, and S61. For explanation purposes, each of the terminals b1, b2, b3, and b4 in FIG. 5 will be referred to the same as each of the terminals b1, b2, b3, and b4 illustrated in FIG. 2, again noting that examples are not limited thereto. In such examples, b1 may be a first output terminal of an inverter, e.g., the inverter 130, b3 may be a second output terminal of the inverter, b2 may be one end of a wireless power transmitter coil, e.g., the coil L_t1, and b4 may be the other end of the. For non-limiting explanation purposes, the inverter will be referred to as the inverter 130 of FIG. 2, and the coil will be referred to as the coil L_t1 of FIG. 2.

The switches S31, S41, S51, and S61 may be turned-off only when the coil L_t1 is determined or set to be used for data communications and may otherwise be maintained in a turned-on state. For example, the switches S31, S41, S51, and S61 may be turned-off only in a case in which a signal within a frequency band used for data communications is applied, determined applied, or set to be applied to the coil L_t1 or the signal of the frequency band used for data communications is received, determined received, or set to be received through the coil L_t1. The frequency band used for data communications may be at or around the above non-limiting example 13.56 MHz data communication frequency, noting that examples are not limited thereto. In another example, the switches S31, S41, S51, and S61 may also be set or caused to be turned on or turned off when neither wireless power transmission or data communication is being performed.

The control or setting of the switches S31, S41, S51, and S61 between the on and off modes of operation may be controlled by a controller, e.g., the controller 150 of FIG. 2. For non-limiting explanation purposes, the controller will be referred to as the controller 150 of FIG. 2. To this end, the controller 150 may include or be connected to circuitry of the wireless power transmitter configured to monitor a frequency or magnitude of the signal received through the coil L_t1. Alternatively, the controller 150 may also control the switches S31, S41, S51, and S61 depending on operation modes of the wireless power transmitter set by the controller 150.

The switches S31 and S41 may be connected to each other in series between the first output terminal b1 of the inverter 130 and one end b2 of the coil L_t1, and the switches S51 and S61 may be connected in series with each other between the second output terminal b3 of the inverter 130 and the other end b4 of the coil L_t1. Herein, respective references to a switch should be understood as respective references to a single switch or a corresponding system of switches.

Although FIG. 5 illustrates a configuration in which a back-to-back switch including the two example semiconductor switches is disposed between the first output terminal b1 of the inverter 130 and one end b2 of the coil L_t1, and a back-to-back switch including another example two semiconductor switches is disposed between the second output terminal b3 of the inverter 130 and the other end b4 of the coil L_t1, examples also include the second connecting circuitry 141 including a relay switch connected between the first output terminal b1 and one end b2 of the coil L_t1 and/or between the second output terminal b3 of the inverter 130 and the other end b4 of the coil L_t1.

Although FIG. 5 illustrates an example where the second connecting circuitry 141 includes four switches, examples include the use of more and less switches for the switching implementations. That is, the second connecting circuitry 142 may include one or more switches.

Figure 6:
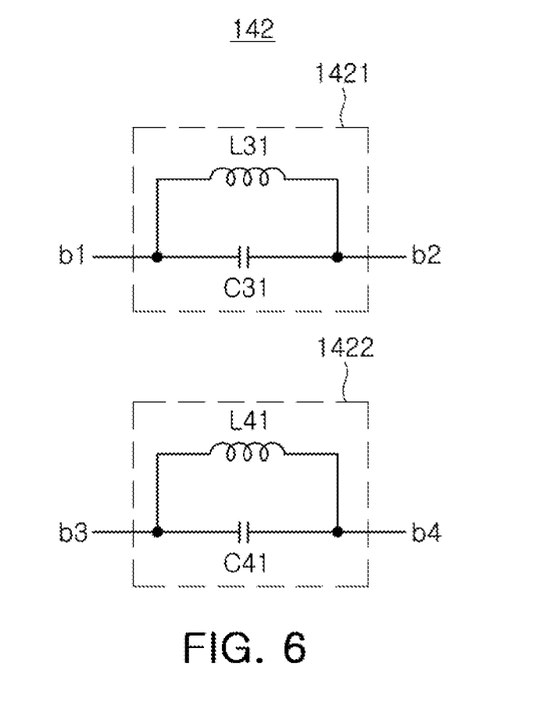

FIG. 6 is a schematic view illustrating an example of a second connecting circuitry of a wireless power transmitter according to one or more embodiments. As a non-limiting example, the second connecting circuitry 142 of FIG. 6 may correspond to the second connecting circuitry 140 of FIG. 2. The second connecting circuitry 142 may include a first filter 1421 and a second filter 1422. For explanation purposes, each of the terminals b1, b2, b3, and b4 in FIG. 6 will be referred to the same as each of the terminals b1, b2, b3, and b4 illustrated in FIG. 2, again noting that examples are not limited thereto.

Each of the first filter 1421 and the second filter 1422 may each be a notch filter of which a cutoff frequency is a frequency used for data communications, such as at or around the above non-limiting example 13.56 MHz data communication frequency. The first filter 1421 may be connected between the first output terminal b1 of an inverter, e.g., the inverter 130 of FIG. 2, and one end b2 of a power transmitting coil, e.g., the coil L_t1, and the second filter 1422 may be connected between the second output terminal b3 of the inverter and the other end b4 of the coil. For non-limiting explanation purposes, the inverter will be referred to as the inverter 130 of FIG. 2, and the coil will be referred to as the coil L_t1 of FIG. 2. As illustrated in FIG. 6, the first filter 1421 may include an inductance or inductor L31 and a capacitance or capacitor C31, connected to each other in parallel, and the second filter 1422 may include an inductance or inductor L41 and a capacitance capacitor C41, connected to each other in series.

Although FIG. 6 illustrates a case in which the second connecting circuitry 142 includes two filters, examples include the second connecting circuitry 142 including one filter or more than two filters. That is, the second connecting circuitry 142 may include one or more notch filters.

Figure 7:
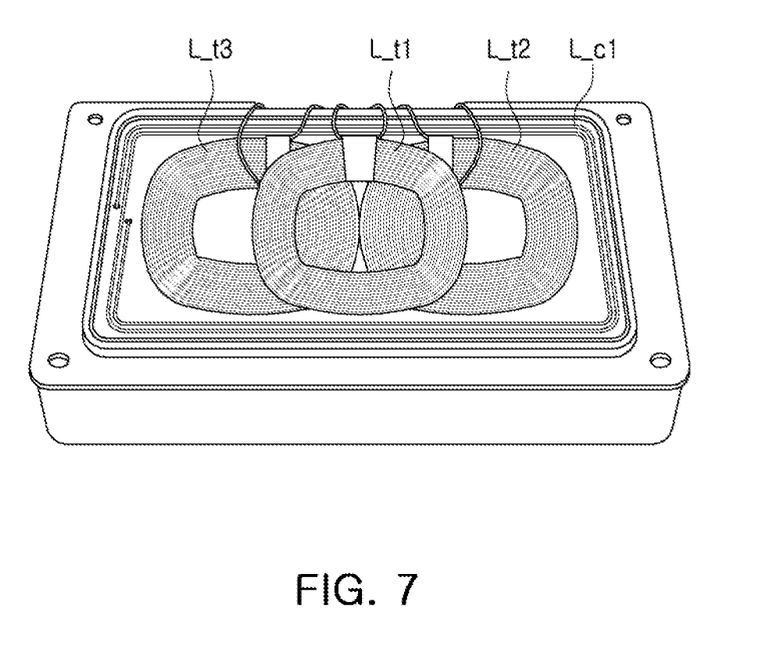
FIG. 7 is a view illustrating a wireless power transmitter, according to one or more embodiments.

FIG. 7 is a view illustrating a wireless power transmitter according to one or more embodiments.

As illustrated in FIG. 7, the wireless power transmitter may include a plurality of coils L_t1, L_t2, and L_t3 for wirelessly transmitting power and a communications coil L_c1 for transmitting and receiving data. Here, the reference to these coils as coils L_t1, L_t2, and L_t3 is for explanatory purposes, as these coils may correspond to coils L_t1, L_t2, and L_t3 of FIG. 1, while noting that examples are not limited thereto. The wireless power transmitter may wirelessly transmit power through any one of the plurality of coils L_t1, L_t2, and L_t3 according to a position of a wireless power receiver, and the like. For example, when a controller of the wireless power transmitter determines that one or more coils of the wireless power receiver are within proximity or range, e.g., within a coupling or preferred coupling range, the controller may selectively control transmission of power to the wireless power receiver using any one of the plurality of coils L_t1, L_t2, and L_t3. In addition, the wireless power transmitter may be further configured to use the communications coil L_c1 as a coil for local communication (e.g., near filed communication (NFC)) by control of such a controller or a data communication module of the wireless power receiver. In an example, the wireless power transmitter and/or the wireless power receiver may respectively correspond to the wireless power transmitter 100 and the wireless power receiver 210 of FIG. 2, noting that examples are not limited thereto. In other examples, either or both of the wireless power transmitter and wireless power receiver may respectively correspond to the wireless power transmitter and wireless power receiver of discussed further below with respect to FIG. 8.

Figure 8:
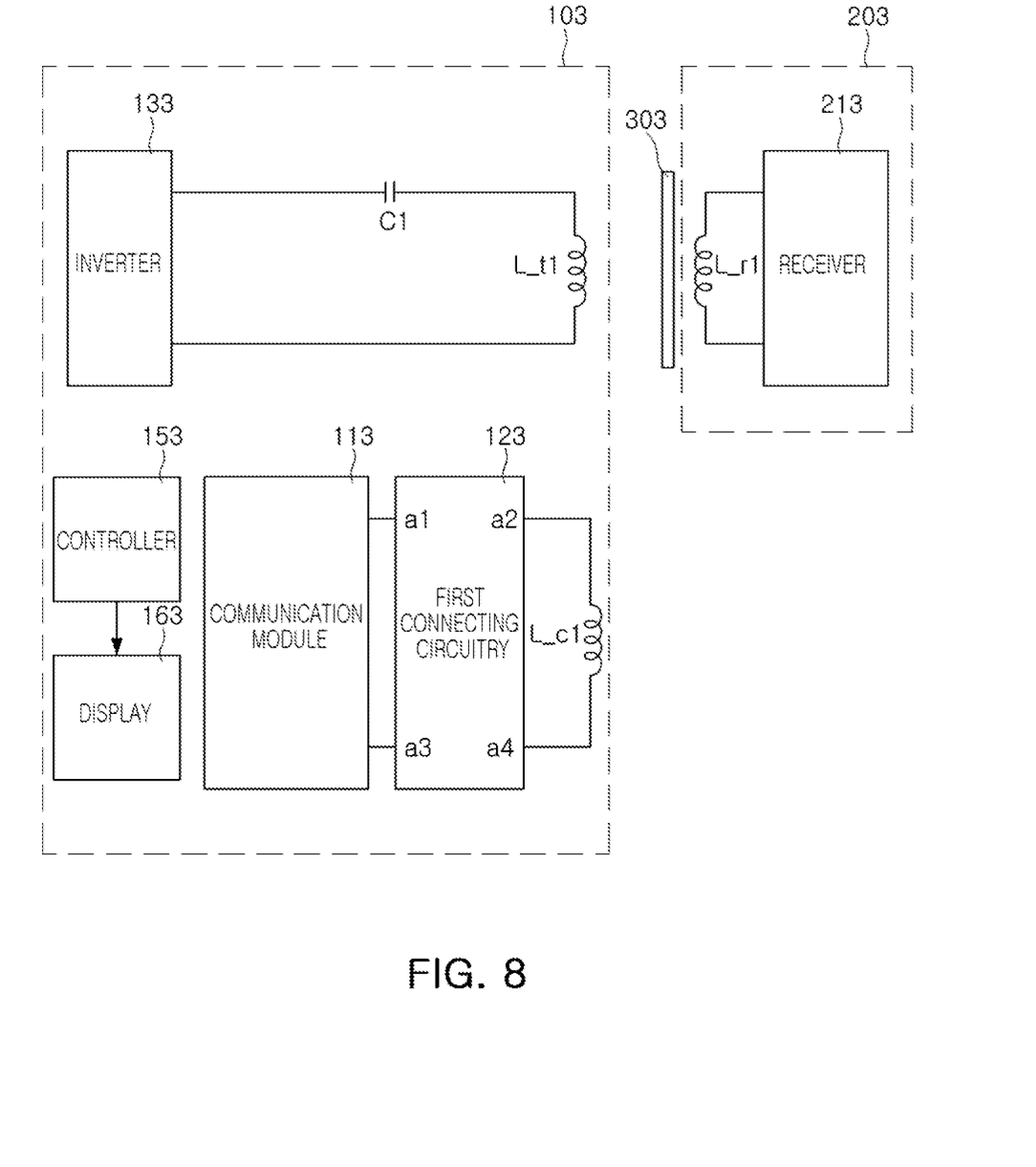
FIG. 8 is a schematic block diagram of a configuration of a wireless power transmitter, according to one or more embodiments.

FIG. 8 is a schematic block diagram of a configuration of the wireless power transmitter according to one or more embodiments. As illustrated in FIG. 8, a wireless power transmitter 103 may include a communication module 113, a first connecting circuitry 123, an inverter 133, a controller 153, a display 163, a capacitor C1, a coil L_t1, and a communications coil L_c1, for example. In FIG. 8, reference numeral 203 denotes a device including the wireless power receiver and reference numeral 303 denotes a card or other element having an NFC capability, hereinafter referred to as card 303. In an example, the card 303 corresponds to card 300 discussed above with respect to FIG. 2.

The wireless power transmitter 103 may wirelessly transmit the power to the device 203 through the coil L_t1. Briefly, as noted above, though the coil L_t1 is referenced and that such a coil may correspond to the coil L_t1 of FIG. 1 or 7, examples are not limited thereto as other coils of FIG. 1 or 7 may be alternatively or additionally used for coil L_t1 of FIG. 8 or still another coil configuration may be used. In addition, the wireless power transmitter 103 may transmit and receive data to and from the card 303 and/or the device 203 through the coil L_c1 or coil L_t1. For example, while the wireless power transmitter 103 may have the configuration illustrated in FIG. 8, the wireless power transmitter 103 may also have the configurations of the wireless power transmitter 100 of FIG. 2 where either the first connecting circuitry 123 or the first connecting circuitry 120 of FIG. 2 is additionally selectively connected to the coil L_t1, as described above with respect to FIG. 2. The wireless power receiver 213 may also have the configuration of the wireless power transmitter 100 or wireless power receiver 210 of FIG. 2, the configuration of the wireless power transmitter 103, a combination of the respective configurations of the wireless power transmitter 100 of FIG. 2 and the wireless power transmitter 103, or another configuration. The wireless power transmitter 103 may be installed as or in various devices. For example, in an example the wireless power transmitter 103 is installed in a vehicle. In an alternative example, the wireless power transmitter 103 may be implemented as a separate apparatus, e.g., as a device primarily directed to providing wireless power to other devices, and which may be supplied the power for transmission from a hardwire and/or battery source of the wireless power transmitter or through another other source, as a non-limiting example.

The communication module 113 may output a signal including data to the communications coil L_c1, or may receive a signal including data through the communications coil L_c1.

The first connecting circuitry 123 may be disposed between the communication module 113 and the communications coil L_c1 and may transmit a signal within a specific frequency band, e.g., at or around 13.56 MHz in a non-limiting example. For example, the purpose of the first connecting circuitry 123 may be the same as the purpose of the first connecting circuitry 120 described with reference to FIG. 2, and such selective provisions and receptions of data may also be the same as discussed above with respect to FIG. 2, e.g., with the controller 153 and/or the communication module 113 controlling the selective provisions and receptions of data.

The communications coil L_c1 may be disposed to be adjacent to one coil (or two or more of the coils L_t1, L_t2, and L_t3) for transmitting power as illustrated in FIG. 7, for example. In addition, in an example the controller 153 may implement a quick charge power transmission mode, where a signal having large power is applied to the one coil (or two or more of the coils L_t1, L_t2, and L_t3). Therefore, when the wireless power transmitter 103 transmits power, the power signal may be induced in the communications coil L_c1 and could be introduced to the communication module 113 unless blocked or prevented from being introduced to the communication module 113.

Thus, the first connecting circuitry 123 may prevent such an induced high power signal from being introduced to the communication module 113, thereby making it possible to perform data communication more efficiently and without errors, and also to prevent the communication module 113 from being damaged by the high power signal.

In examples, the first connecting circuitry 123 may have the same configuration as that of the first connecting circuitry illustrated in either of FIGS. 3 and 4. In such examples, each of the terminals a1, a2, a3, and a4 of FIGS. 3 and 4 may be the same as each of the terminals a1, a2, a3, and a4 illustrated in FIG. 8, noting that examples are not limited to the configurations of FIGS. 3 and 4.

The configurations and operations of the inverter 133, the capacitance or capacitor C1, the example coil L_t1, the controller 153, the display 163, the device 203, the wireless power receiver 213, the card 303, and the like may be the same as those of the inverter 130, the capacitance or capacitor C1, the coil L_t1, the controller 150, the display 160, the device 200, the wireless power receiver 210, the card 300, and the like described with reference to FIG. 2, though examples are not limited thereto.

Figure 9:
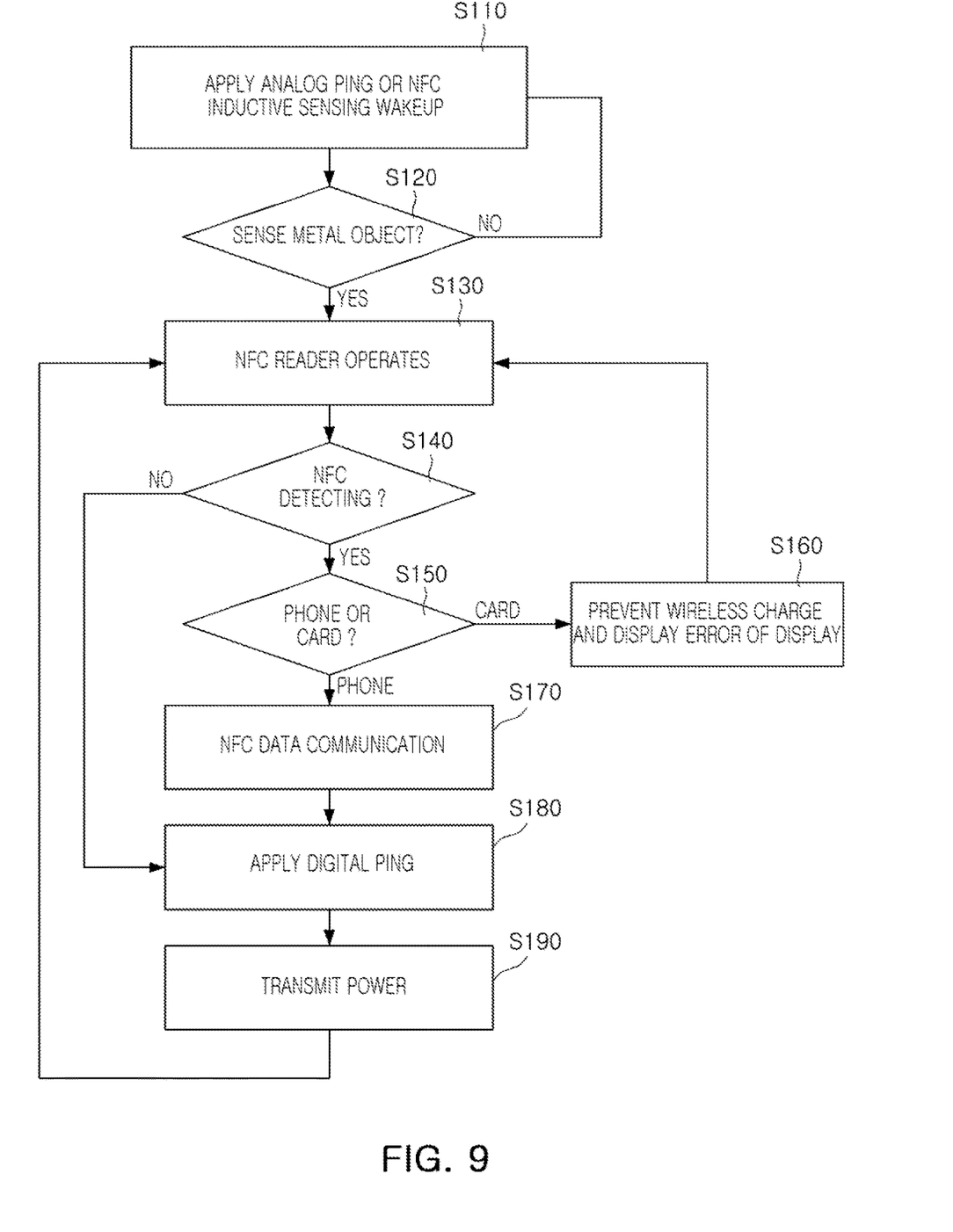
FIG. 9 is a flow chart illustrating a wireless power transmission method, according to one or more embodiments.

FIG. 9 is a flow chart of a wireless power transmission method according to one or more embodiments. Below, for explanation purposes references will be made to the wireless power transmission method being implemented by a wireless power transmitter, e.g., corresponding to wireless power transmitter 100 and/or wireless power transmitter 103, noting that examples are not limited thereto.

The wireless power transmitter may transmit an analog ping signal or transmit a signal (e.g., an NFC inductive sensing wakeup signal) for determining whether to wake-up, e.g., changing a power usage state from a sleep or low power usage state to an awake or full power usage state, a communications module, e.g., of the wireless power transmitter, to determine whether any object is in proximity, in operation S110. Thus, in an example, the wireless power transmitter may transit the analog ping or transmit the signal prior to waking up the communication module, for example. The analog ping or the signal may be controlled to be transmitted by any of the coils of the wireless power transmitter.

After the transmission of the analog ping or transmitted signal, e.g., next, the wireless power transmitter may determine whether there is an object in proximity, in operation S120. For example, the wireless power transmitter may determine that an object including a metal is in proximity by detecting that an impedance of a coil from which the signal was transmitted has changed after the transmission of the signal in operation S110, and determine that no object including metal is within the proximity of the wireless power transmitter.

As a result of the determination in the operation S120, if an object is not detected within the proximity of the wireless power transmitter, the operation S110 may be performed. For example, the operation S100 may be performed at predetermined intervals until an object is detected in operation S120.

When the determination in the operation (S120) indicates that an object is in proximity of the wireless power transmitter, the wireless power transmitter may thereafter be selectively controlled or operated also as an apparatus for transmitting and receiving data, in operation S130. For example, the wireless power transmitter may be selectively operated as an NFC reader by activating the communication module of the wireless power transmitter.

In addition, the wireless power transmitter may also, e.g., subsequent to operation S130, determine whether the object in proximity is an object (e.g., a smartphone or a card) having a data transmission and reception capability, in operation S140. For example, the wireless power transmitter may determine whether the detected object in operation S120 is an object configured to perform communications in accordance with an NFC scheme.

As a result of the determination in the operation S140, when the object in proximity has thereby been determined to be an object that does not have the data transmission and reception capability, the wireless power transmitter may output a digital ping signal to determine whether or not the object in proximity is a wireless power receiver, in operation S180, and if the object in proximity is the wireless power receiver, the wireless power transmitter may control the transmission of power to the wireless power receiver, in operation S190.

As a result of the determination in the operation S140, when the object in proximity has thereby been determined to be an object having the data transmission and reception capability, the wireless power transmitter may determine whether the object is a mobile device such as a smartphone or whether the objected is a card, in operation S150. Here, the card may correspond to the aforementioned card 300, for example. In an example implementation of operation S150, the wireless power transmitter may determine that the object is the mobile device such as the smartphone when the received signal is detected to be modulated according to an active load modulation, and the wireless power transmitter may otherwise determine that the object is the card.

As a result of the determination in the operation (S150), when the object in proximity is determined to be the card, the wireless power transmitter may not transmit power to the wireless power receiver, e.g., until the card is removed from the proximity, and may inform a user that the card is positioned to be adjacent to the wireless power transmitter through a display, such as through the display 160 of FIG. 2 or display 163 of FIG. 8, in operation S160, though not limited thereto.

As a result of the determination in the operation (S150), when the object in proximity is determined to be the mobile device such as the smartphone, the wireless power transmitter through a communication module (e.g., through the communication module 110 of FIG. 2 or the communication module 113 of FIG. 8) of the wireless power transmitter may obtain necessary information by performing data communications with a communication module of the object, in operation S170.

Thereafter, the wireless power transmitter may again output the digital ping signal to determine whether the object in proximity is the wireless power receiver, in operation S180, and may begin transmission of power to object, as the wireless power receiver, in operation S190.

In an example, the wireless power transmission method of FIG. 9 may be performed by a controller of the wireless power transmitter, such as by the controller 150 of FIG. 2 or the controller 153 of FIG. 8, though examples are not limited thereto.

According to one or more of the wireless power transmission methods described herein, when a card having the NFC capability is determined to be disposed to be within a proximity of the wireless power transmitter, e.g., closer to the wireless power transmitter than a nearby wireless power receiver, the wireless power transmitter may be prevented from transmitting wireless power to the wireless power receiver, thereby preventing damage on an NFC chip of the card having the NFC capability.

As set forth above, a wireless power transmitter, according to various embodiments described herein, may efficiently transmit and receive the data without error, for example. In addition, in various embodiments described herein, damage to the communication module transmitting and receiving the data, due to the power being wirelessly transmitted, may be prevented.

As a non-exhaustive example only, the wireless power transmitters and wireless power receivers as described herein may each be any of a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard. Also, while card 300 is described herein as a card or other element, the card 300 may also be a wearable device or lanyard, as non-limiting examples, which may come within the proximity of the wireless power transmitter.

The wireless power transmitter 100, inverter 130, second connecting circuitry 140, capacitance C1, each coil herein, each capacitance or capacitor herein, each inductance or inductor herein, controller 150, display 160, first connecting circuitry 120, communication module 110, wireless power receiver 210, device 200, device 203, wireless power receiver 213, card 300, each switch herein, wireless power transmitter 103, inverter 133, controller 153, display 163, communication module 113, first connecting circuitry 123, and card 303 in FIGS. 1-8 that perform the operations described in this application are implemented by hardware components configured to perform the operations described in this application that are performed by the hardware components. Examples of hardware components that may be used to perform the operations described in this application where appropriate include controllers, sensors, amplifiers, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

In a non-limiting example, methods illustrated in FIG. 9 that perform the operations described in this application are performed or controlled to be performed by computing hardware, for example, by one or more processors or computers represented by the illustrated controllers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media also represented by the example illustrated controllers, or otherwise configured within the respective wireless power transmitters. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a main coil configured to transmit power;
   an inverter configured to apply an alternating current (AC) signal to the main coil;
   a communication module configured to output a transmission signal including transmission data to be wirelessly transmitted the wireless power transmitter, and/or receive a reception signal including received data wirelessly received by the wireless power transmitter;
   a first connecting circuitry configured to prevent a power signal of the main coil from being input to the communication module; and
   an auxiliary coil configured to connect to the main coil and connected to the first connecting circuitry.

2. The wireless power transmitter of claim 1, wherein the first connecting circuitry is disposed between the main coil and the communication module and configured to prevent the power signal of the main coil from affecting the communication module, and the auxiliary coil is connected with the main coil in parallel through selective connection of the first connecting circuitry to the main coil for transmission of the transmission data by the main coil or for reception of the reception signal received by the main coil.

3. The wireless power transmitter of claim 1, wherein the auxiliary coil is not wiredly connected to the main coil, and the transmission data is transmitted by the auxiliary coil or the reception signal is received by the auxiliary coil.

4. The wireless power transmitter of claim 1, wherein a first input terminal of the communication module is connected to one end of the main coil through the first connecting circuitry,
   a second input terminal of the communication module is connected to another end of the main coil through the first connecting circuitry, and
   the auxiliary coil is connected between the first input terminal of the communication module and the second input terminal of the communication module.

5. The wireless power transmitter of claim 4, wherein the main coil has an
   inductance, which in combination with a connected capacitance, is configured to generate a resonance tank for wirelessly transmitting power, and the auxiliary coil has an inductance that when selectively connected in parallel with the main coil results in a lower combined inductance for wireless transmitting the transmission data at a frequency of 13.56 MHz or wirelessly receiving the received data at the frequency of 13.56 MHz.

6. The wireless power transmitter of claim 1, wherein the auxiliary coil is a chip inductor.

7. The wireless power transmitter of claim 1, wherein first connecting circuitry includes:
   a first switching element connected between one end of the main coil and a first input terminal of the communication module; and
   a second switching element connected between another end of the main coil and a second input terminal of the communication module.

8. The wireless power transmitter of claim 7, wherein the wireless power transmitter further comprise a controller configured to control the first switching element and the second switching element to be turned-off when the inverter outputs the AC signal, and to be turned-on when the communication module outputs the transmission signal or the reception signal is received by the main coil.

9. The wireless power transmitter of claim 1, wherein the first connecting circuitry includes:
 a first filter connected between one end of the main coil and a first input terminal of the communication module and having a pass frequency band, a frequency band used for data communications; and
 a second filter connected between another end of the main coil and a second input terminal of the communication module and having the pass frequency band.

10. The wireless power transmitter of claim 9, wherein the pass frequency band includes a frequency of 13.56 MHz and does not include power transmission frequencies.

11. The wireless power transmitter of claim 9, wherein each of the first filter and the second filter includes:
 an inductance; and
 a capacitance connected to the inductance in series.

12. The wireless power transmitter of claim 1, further comprising a second connecting circuitry disposed between the main coil and the inverter and configured to prevent the transmission signal or the reception signal from being introduced to the inverter.

13. The wireless power transmitter of claim 12, wherein the second connecting circuitry includes:
 a first switching element connected between one end of the main coil and a first input terminal of the inverter; and
 a second switching element connected between another other end of the main coil and a second input terminal of the inverter.

14. The wireless power transmitter of claim 12, wherein the second connecting circuitry includes:
 a first filter connected between one end of the main coil and a first input terminal of the inverter and having a cutoff frequency band, a frequency band used for data communications; and
 a second filter connected between another end of the main coil and a second input terminal of the inverter and having the cutoff frequency band.

15. The wireless power transmitter of claim 14, wherein the cut off frequency band includes 13.56 MHz.

16. The wireless power transmitter of claim 1, wherein the wireless power transmitter further comprises a controller configured to determine whether a data communications card is in proximity of the wireless power transmitter using a received signal received by the main coil, and controls power to not be transmitted when the data communications card is determined to be in proximity of the wireless power transmitter.

17. The wireless power transmitter of claim 16, wherein, when the controller determines that the received signal received by the main coil is not a signal modulated by an active load modulation, the controller determines that the data communications card is in proximity of the wireless power transmitter.

18. The wireless power transmitter of claim 16, further comprising a display configured to display, when the data communications card is detected in proximity of the wireless power transmitter, an indication that the data communications card is in proximity of the wireless power transmitter.

19. A wireless power transmitter comprising:
 a power transmitting coil configured to transmit power;
 a communications coil configured to transmit and receive data and disposed separate from and adjacent to the power transmitting coil;
 an inverter configured to apply an alternating current (AC) signal to the power transmitting coil;
 a communication module configured to output a transmission signal including transmission data to be transmitted by the communications coil and/or receive a reception signal including received data received through the communications coil; and
 a connecting circuitry disposed between the communications coil and the communication module and configured to prevent power induced, by another coil outside of the communications coil, in the communications coil from being introduced to the communication module.

20. The wireless power transmitter of claim 19, wherein the connecting circuitry includes:
 a first filter connected between one end of the communications coil and a first input terminal of the communication module and having a pass frequency band, a frequency band used for data communications; and
 a second filter connected between another end of the communications coil and a second input terminal of the communication module and having the pass frequency band.

21. The wireless power transmitter of claim 20, wherein the pass frequency band includes a frequency of 13.56 MHz and does not include power transmission frequencies.

22. The wireless power transmitter of claim 19, wherein the wireless power transmitter further comprises a controller configured to determine whether a data communications card is in proximity of the wireless power transmitter using a received signal received by the power transmitting coil, and controls power to not be transmitted when the controller determines that the data communications card is in proximity of the wireless power transmitter.

23. A wireless power transmitter comprising:
 a resonance tank configured for wireless power transfer using an alternating current
 (AC) signal from an AC source;
 a first connecting circuitry configured to prevent a power signal of the resonance tank from being input to a near field communication module configured to output a transmission signal including transmission data to be transmitted by the wireless power transmitter and/or receive a reception signal including received data by the wireless power transmitter; and
 an auxiliary coil configured to connect to the main coil and connected to the first connecting circuitry.

24. The wireless power transmitter of claim 23, further comprising the AC source configured for selective non-provision of the AC signal to the resonance tank when a near field communication element is determined within a proximity of the wireless power transmitter.

25. The wireless power transmitter of claim 23, further comprising the near field communication module configured for selective output of the transmission signal or reception of the reception signal when a near field communication element is determined within a proximity of the wireless power transmitter.

26. The wireless power transmitter of claim 23, further comprising a second connecting circuitry configured to prevent near field communication data from affecting the AC source.

27. The wireless power transmitter of claim 23, wherein the first connecting circuitry prevents the power signal of the resonance tank, provided through wireless coupling from the resonance tank, from being input to the near field communication module, and the first connecting circuitry band passes or selectively connects the transmission signal or the reception signal between the auxiliary coil and the near field communication module.

28. The wireless power transmitter of claim 23, wherein the first connecting circuitry prevents the power signal of the resonance tank, provided through wired connection with the resonance tank, from being input to the near field communication module, and the first connecting circuitry band passes or selectively connects the transmission signal or the reception signal between the near field communication module and the resonance tank.

29. The wireless power transmitter of claim 23, wherein the first connecting circuitry selectively connects the auxiliary coil to the resonance tank, and wherein the resonance tank has a first inductance when the auxiliary coil is selectively not connected to the resonance tank by the first connecting circuitry, and has a lower second inductance when the auxiliary coil is selectively connected to the resonance tank by the first connecting circuitry with a higher self-resonance frequency.

* * * * *